(12) United States Patent  
Hirata et al.

(10) Patent No.: US 8,172,631 B2  
(45) Date of Patent: May 8, 2012

(54) SYSTEM AND METHOD FOR BONDING OPTICAL FILM TO A LIQUID CRYSTAL DISPLAY PANEL

(75) Inventors: Satoshi Hirata, Ibaraki (JP); Seiji Kondou, Ibaraki (JP); Seiji Umemoto, Ibaraki (JP); Takuya Nakazono, Ibaraki (JP)

(73) Assignee: Nitto Denko Corporation, Ibaraki-shi, Osaka (JP)

( * ) Notice: Subject to any disclaimer, the term of this patent is extended or adjusted under 35 U.S.C. 154(b) by 0 days.

(21) Appl. No.: 13/021,294

(22) Filed: Feb. 4, 2011

(65) Prior Publication Data

US 2012/0071057 A1    Mar. 22, 2012

(30) Foreign Application Priority Data

Sep. 17, 2010 (JP) ................................. 2010-209729  
Nov. 10, 2010 (JP) ................................. 2010-251958

(51) Int. Cl.  
*H01J 9/00* (2006.01)  
*B32B 41/00* (2006.01)  
(52) U.S. Cl. .......................................... 445/24; 349/96  
(58) Field of Classification Search .................. 445/66, 445/23–25; 156/64, 378; 349/96  
See application file for complete search history.

(56) References Cited

U.S. PATENT DOCUMENTS

| 7,022,204 | B2 | 4/2006 | Kanbara et al. |
|---|---|---|---|
| 2005/0016670 | A1 | 1/2005 | Kanbara et al. |
| 2006/0124248 | A1 | 6/2006 | Kanbara et al. |
| 2009/0218049 | A1 | 9/2009 | Kanbara et al. |
| 2009/0263608 | A1 | 10/2009 | Kitada et al. |
| 2010/0186890 | A1 | 7/2010 | Kitada et al. |
| 2010/0206977 | A1 | 8/2010 | Kitada et al. |
| 2010/0212822 | A1 | 8/2010 | Kitada et al. |
| 2010/0258250 | A1 | 10/2010 | Kitada et al. |
| 2010/0282406 | A1 | 11/2010 | Kitada et al. |
| 2010/0300606 | A1 | 12/2010 | Kitada et al. |
| 2011/0030884 | A1 | 2/2011 | Yura et al. |

FOREIGN PATENT DOCUMENTS

| EP | 2216674 A1 | 8/2010 |
|---|---|---|
| JP | 10-264071 A | 10/1998 |
| JP | 2004-155593 A | 6/2004 |
| JP | 2005-37417 A | 2/2005 |
| JP | 4307510 B1 | 8/2009 |

(Continued)

OTHER PUBLICATIONS

Japanese Office Action dated Feb. 4, 2011, issued in corresponding Japanese Patent Application No. 2010-251958.

(Continued)

*Primary Examiner* — Joseph L Williams  
(74) *Attorney, Agent, or Firm* — Westerman, Hattori, Daniels & Adrian, LLP

(57) ABSTRACT

There are provided a system and a method for manufacturing a liquid crystal display element, which make it possible to perform a lamination process in a smaller installation space, and which are provided to perform a process including turning over and horizontally rotating a liquid crystal panel using a panel turning unit, feeding optical functional films from first and second continuous rolls, respectively, using film feeding lines arranged linearly in planar view, feeding the liquid crystal panel using a panel feeding line placed above the film feeding lines in an overlapping manner and shaped linearly in planar view, and bonding each of the optical functional films, which are fed from the first and second rolls, to the liquid crystal panel from below.

18 Claims, 11 Drawing Sheets

FOREIGN PATENT DOCUMENTS

| | | |
|---|---|---|
| JP | 2009-205138 A | 9/2009 |
| JP | 2009-276754 A | 11/2009 |
| JP | 4406043 A | 1/2010 |
| JP | 2010-030744 A | 2/2010 |
| TW | 201008726 A1 | 3/2010 |

OTHER PUBLICATIONS

Taiwanese Office Action dated Nov. 24, 2011, issued in corresponding Taiwanese Patent Application No. 099140220.

European Search Report dated Dec. 22, 2011, issued in corresponding European Patent Application No. 11153676.9.

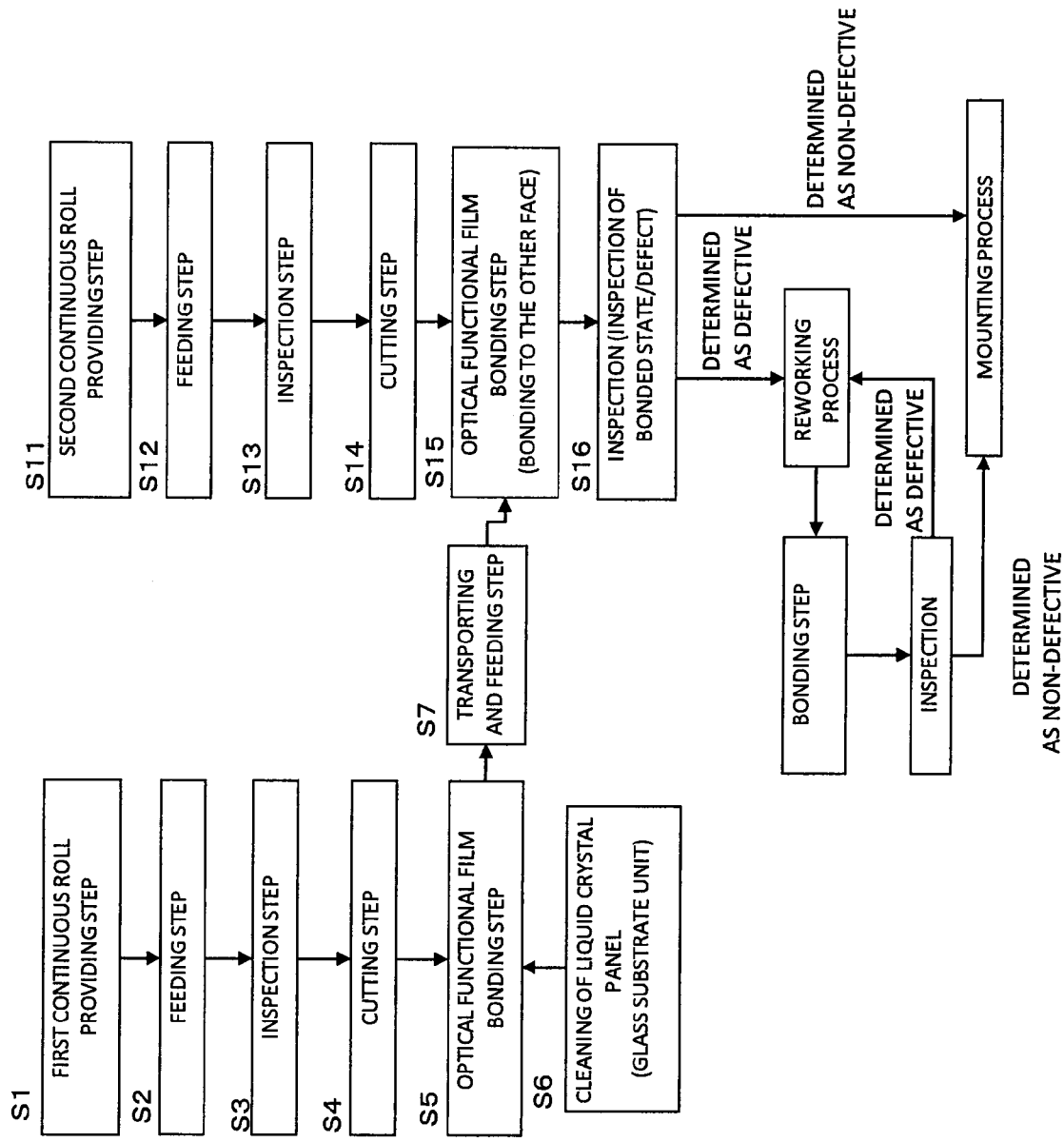

Fig.6
(a)
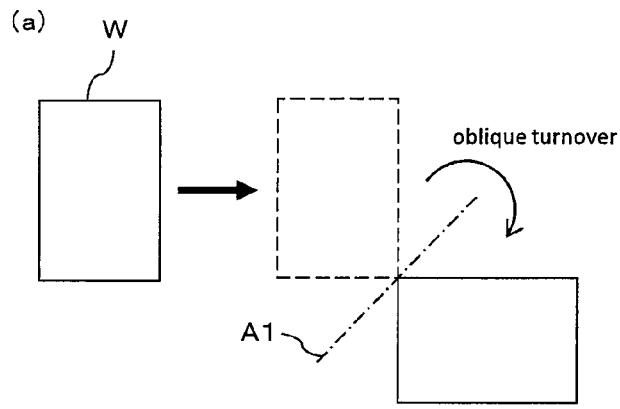
(b)
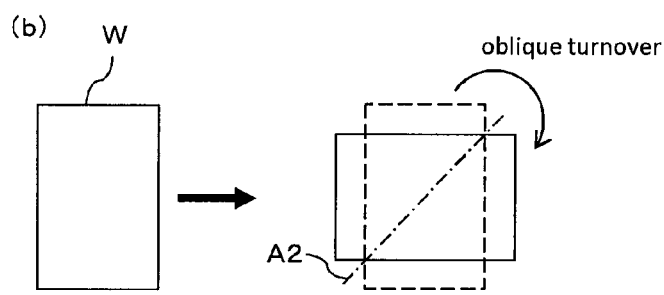
(c)
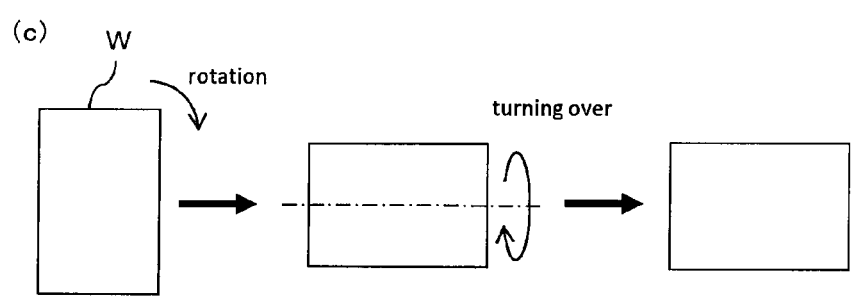
(d)
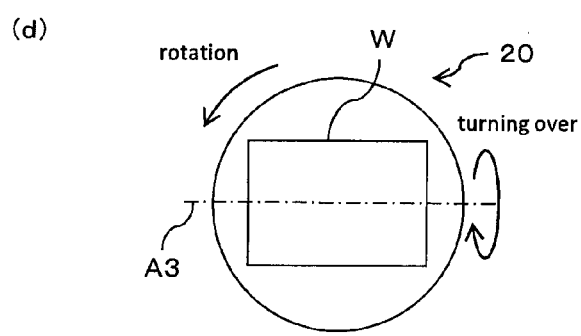

Fig.8A
(a)
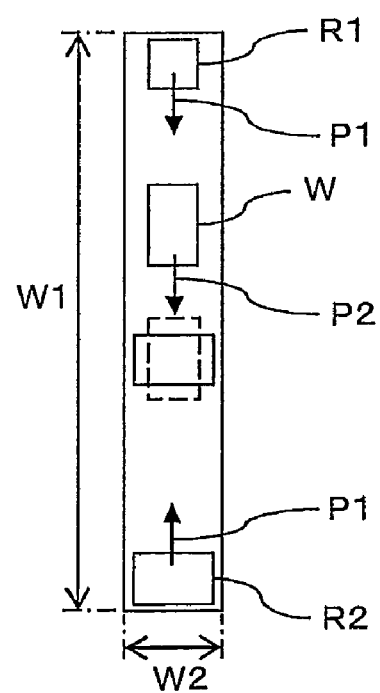
(b)
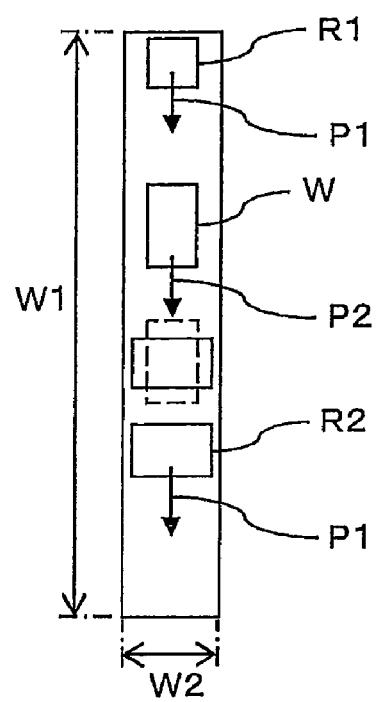

Fig.8B
(a)
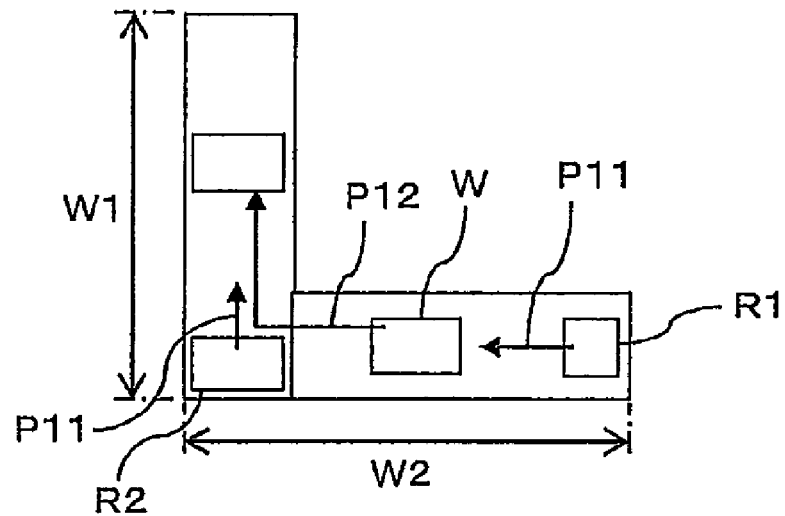
(b)
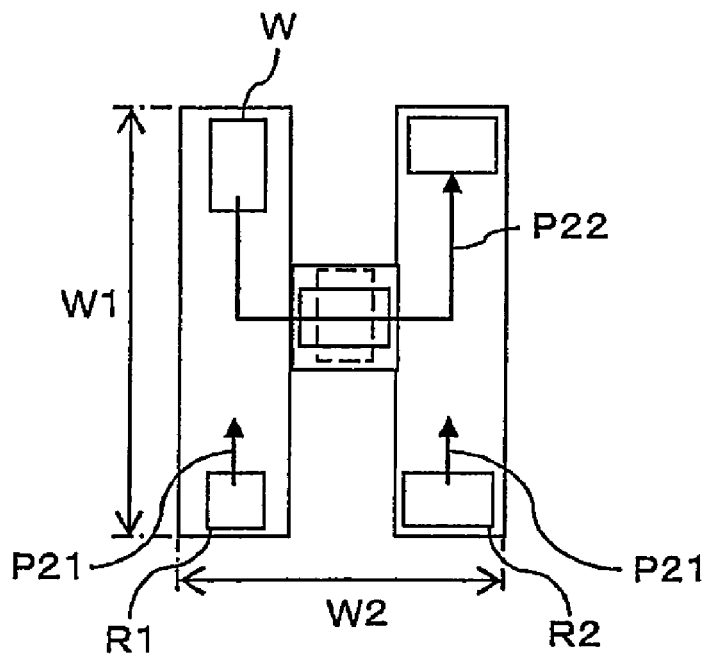

SYSTEM AND METHOD FOR BONDING OPTICAL FILM TO A LIQUID CRYSTAL DISPLAY PANEL

BACKGROUND OF THE INVENTION

1. Field of the Invention

The invention relates to a system and a method for manufacturing a liquid crystal display element by bonding sheet pieces of optical functional films including polarizing films to both surfaces of a rectangular liquid crystal panel using first and second continuous rolls with different widths.

2. Description of the Related Art

A known example of a liquid crystal display manufacturing system as mentioned above is configured to turn over a substrate 1 to which a piece 19A of a long film 10A has been bonded and then to bond a piece 19B of another long film 10B to the substrate 1 (see for example Japanese Patent Application Laid-Open (JP-A) No. 2005-37417, paragraphs [0037] to [0044] and FIGS. 6 to 9).

However, the manufacturing system disclosed in Japanese Patent Application Laid-Open (JP-A) No. 2005-37417 has the problem that the installation space is larger than required, because it has an L-shaped manufacturing line in which the direction of feeding the long film 10A from a delivery roll 56A is perpendicular to the direction of feeding the long film 10B from a delivery roll 56B.

On the other hand, there is proposed a manufacturing system including a rotation mechanism for rotating an optical display unit (liquid crystal panel), which can make the installation space compact even when rolls with different widths corresponding to the long and short sides of a rectangular liquid crystal panel are used (see for example Japanese Patent No. 4307510).

PRIOR ART LITERATURE

Patent Document

Patent Document 1: Japanese Patent Application Laid-Open (JP-A) No. 2005-37417
Patent Document 2: Japanese Patent No. 4307510 Publication As liquid crystal displays are made larger horizontally, it is required to design a more compact manufacturing line with lamination accuracy and function kept high. In particular, as the performance of liquid crystal display elements increases, it also becomes important to control the temperature and humidity conditions and to maintain the cleanliness of rolls and liquid crystal panels during manufacture with lamination accuracy kept high.

SUMMARY OF THE INVENTION

The invention has been made under the circumstances described above, and an object of the invention is to provide a system and a method for manufacturing a liquid crystal display element, which make it possible to perform a lamination process well in a more compact installation space.

A system for manufacturing a liquid crystal display element according to the present invention relates to a system with a linear line structure for manufacturing a liquid crystal display element by a process comprising feeding optical functional films from first and second continuous rolls with different widths, respectively, which are each formed by winding, into a roll, a long optical functional film comprising a polarizing film, transversely cutting the optical functional films into sheet pieces of the optical functional films, and bonding the sheet pieces to both surfaces of a rectangular liquid crystal panel, comprising:

film feeding lines that are arranged to feed the optical functional films from the first and second continuous rolls in such a manner that the optical functional films being fed are linearly aligned with each other in planar view;

a panel feeding line that is placed above the film feeding lines in an overlapping manner and placed to feed the liquid crystal panel linearly in planar view; and a panel turning unit that is provided in the panel feeding line to turn over and horizontally rotate the liquid crystal panel so that bonding of one of the sheet pieces of the optical functional films to the liquid crystal panel from below can be followed by bonding of another one of the sheet pieces of the optical functional films thereto from below.

As used herein, the expression "arranged . . . linearly in planar view" means that the arrangement is such that in planar view, the object can be transported along a straight line with its transverse movement (movement in a direction perpendicular to the straight line) being sufficiently small relative to its transport length along the straight line, which is intended to also include such an arrangement that in planar view, the object can be transported through a serpentine feed path along a straight line and such an arrangement that the object can be transported through a feed path that is composed of plural linear feed lines connected along a straight line and displaced in the transverse direction so that the object can be continuously transported while being shifted in the transverse direction of the line.

According to an embodiment of the invention, the panel turning unit turns over and horizontally rotates the liquid crystal panel, which makes it possible to feed optical functional films in film feeding lines arranged in such a manner that the optical functional films being fed from first and second continuous rolls are linearly aligned in planar view and also makes it possible to feed the liquid crystal panel in a panel feeding line that is placed above the film feeding lines in an overlapping manner and formed linearly in planar view. In other words, the optical functional films and the liquid crystal panel are fed along the film feeding lines and the panel feeding line, which extend linearly in planar view, so that an I-shaped manufacturing line can be formed. Such an I-shaped manufacturing line can be installed in a more compact space than an L-shaped manufacturing line or the like.

In particular, the panel feeding line is placed above the film feeding lines so that both of the optical functional films fed from the first and second continuous rolls can be bonded to the liquid crystal panel from below, which makes it possible to prevent foreign bodies from falling on the liquid crystal panel surface to be bonded and to perform the bonding in a satisfactory manner.

An another system for manufacturing a liquid crystal display element according to the present invention relates to a system with a linear line structure for manufacturing a liquid crystal display element by a process comprising feeding optical functional films from first and second continuous rolls with different widths, respectively, which are each formed by winding, into a roll, a long optical functional film comprising a polarizing film, transversely cutting the optical functional films into sheet pieces of the optical functional films, and bonding the sheet pieces to both surfaces of a rectangular liquid crystal panel, comprising:

film feeding lines that are arranged to feed the optical functional films from the first and second continuous rolls in such a manner that the optical functional films being fed are linearly aligned with each other in planar view;

a panel feeding line that is placed above the film feeding lines in an overlapping manner and placed to feed the liquid crystal panel linearly in planar view; and a panel turning unit that is provided in the panel feeding line to turn over the liquid crystal panel about an axis neither parallel to a long side of the liquid crystal panel nor to a short side of the liquid crystal panel so that a positional relationship between the long and short sides of the liquid crystal panel can be reversed and that bonding of one of the sheet pieces of the optical functional films to the liquid crystal panel from below can be followed by bonding of another one of the sheet pieces of the optical functional films thereto from below.

According to an embodiment of the invention, it is possible to achieve the same effect through a single operation as in the case where turning over the liquid crystal panel and rotating it horizontally are performed independently. Therefore, the length of the panel turning unit can be made shorter, so that the installation space can be further made smaller. Such an advantageous effect becomes more significant as liquid crystal displays are made larger horizontally.

It is preferable that the system is configured to manufacture the liquid crystal display element by a process comprising feeding optical functional films and carrier films from first and second continuous rolls with different widths, respectively, which are each formed by winding, into a roll, a laminate comprising a carrier film and a long optical functional film comprising a polarizing film, transversely cutting the optical functional films into sheet pieces of the optical functional films, while leaving the carrier films uncut, peeling off the sheet pieces from the carrier films, and bonding the sheet pieces to both surfaces of the rectangular liquid crystal panel, wherein the film feeding lines are provided with first and second take-up rolls for taking up the carrier films having been fed from the first and second continuous rolls, respectively, after the sheet pieces of the optical functional films are peeled off from the carrier films, and the first take-up roll and the first continuous roll are arranged in this order along a direction parallel to the feeding direction of the liquid crystal panel in the panel feeding line, and the second take-up roll and the second continuous roll are arranged in this order along a direction parallel to the feeding direction of the liquid crystal panel in the panel feeding line.

According to an embodiment of the invention, the optical functional film can be fed from the first continuous roll at the same level as the carrier film is wound onto the first take-up roll, and the optical functional film can be fed from the second continuous roll at the same level as the carrier film is wound onto the second take-up roll. This allows easy attachment or detachment of the continuous rolls and the take-up rolls. For example, when the continuous rolls and the take-up rolls are attached or detached using an attachment/detachment mechanism, there is no need to control the level of the attachment/detachment mechanism, which improves the workability.

An another system for manufacturing a liquid crystal display element according to the present invention relates to a system with a linear line structure for manufacturing a liquid crystal display element by a process comprising feeding sheet pieces of optical functional films and carrier films from first and second continuous rolls with different widths, respectively, which are each formed by winding, into a roll, a laminate comprising a carrier film and sheet pieces of an optical functional film comprising a polarizing film, peeling off the sheet pieces of the optical functional films from the carrier films, and bonding the sheet pieces to both surfaces of a rectangular liquid crystal panel, comprising:

film feeding lines that are arranged to feed the optical functional films from the first and second continuous rolls in such a manner that the optical functional films being fed are linearly aligned with each other in planar view;

a panel feeding line that is placed above the film feeding lines in an overlapping manner and placed to feed the liquid crystal panel linearly in planar view; and a panel turning unit that is provided in the panel feeding line to turn over and horizontally rotate the liquid crystal panel so that bonding of one of the sheet pieces of the optical functional films to the liquid crystal panel from below can be followed by bonding of another one of the sheet pieces of the optical functional films thereto from below.

An another system for manufacturing a liquid crystal display element according to the present invention relates to a system with a linear line structure for manufacturing a liquid crystal display element by a process comprising feeding sheet pieces of optical functional films and carrier films from first and second continuous rolls with different widths, respectively, which are each formed by winding, into a roll, a laminate comprising a carrier film and sheet pieces of an optical functional film comprising a polarizing film, peeling off the sheet pieces of the optical functional films from the carrier films, and bonding the sheet pieces to both surfaces of a rectangular liquid crystal panel, comprising:

film feeding lines that are arranged to feed the optical functional films from the first and second continuous rolls in such a manner that the optical functional films being fed are linearly aligned with each other in planar view;

a panel feeding line that is placed above the film feeding lines in an overlapping manner and placed to feed the liquid crystal panel linearly in planar view; and a panel turning unit that is provided in the panel feeding line to turn over the liquid crystal panel about an axis neither parallel to a long side of the liquid crystal panel nor to a short side of the liquid crystal panel so that a positional relationship between the long and short sides of the liquid crystal panel can be reversed and that bonding of one of the sheet pieces of the optical functional films to the liquid crystal panel from below can be followed by bonding of another one of the sheet pieces of the optical functional films thereto from below.

It is preferable that the film feeding lines are provided with first and second take-up rolls for taking up the carrier films having been fed from the first and second continuous rolls, respectively, after the sheet pieces of the optical functional films are peeled off from the carrier films, and the first take-up roll and the first continuous roll are arranged in this order along a direction parallel to the feeding direction of the liquid crystal panel in the panel feeding line, and the second take-up roll and the second continuous roll are arranged in this order along a direction parallel to the feeding direction of the liquid crystal panel in the panel feeding line.

It is preferable that the system further comprising a partition structure in which the film feeding lines and the panel feeding line are placed.

According to an embodiment of the invention, the film feeding lines and the panel feeding line are placed in a partition structure so that contamination with foreign bodies from the outside can be prevented and that the bonding can be performed in a more satisfactory manner. When air is circulated in the partition structure to keep the inside of the partition structure clean, an I-shaped manufacturing line can produce better air flow than an L-shaped manufacturing line or the like. Thus, dust retention is prevented so that the cleanliness of the continuous rolls and the liquid crystal panel can be kept high during manufacture, and the temperature and humidity conditions can be controlled well during manufacture.

A method for manufacturing a liquid crystal display element according to the present invention relates to a method for manufacturing a liquid crystal display element by a process comprising feeding optical functional films from first and second continuous rolls with different widths, respectively, which are each formed by winding, into a roll, a long optical functional film comprising a polarizing film, transversely cutting the optical functional films into sheet pieces of the optical functional films, and bonding the sheet pieces to both surfaces of a rectangular liquid crystal panel, comprising:

a film feeding step comprising feeding the optical functional films from the first and second continuous rolls using film feeding lines arranged in such a manner that the optical functional films being fed are linearly aligned with each other in planar view;

a panel feeding step comprising feeding the liquid crystal panel using a panel feeding line that is placed above the film feeding lines in an overlapping manner and placed to feed the liquid crystal panel linearly in planar view; and a panel turning step comprising turning over and horizontally rotating the liquid crystal panel using a panel turning unit that is provided in the panel feeding line so that bonding of one of the sheet pieces of the optical functional films to the liquid crystal panel from below can be followed by bonding of another one of the sheet pieces of the optical functional films thereto from below.

An another method for manufacturing a liquid crystal display element according to the present invention relates to a method for manufacturing a liquid crystal display element by a process comprising feeding optical functional films from first and second continuous rolls with different widths, respectively, which are each formed by winding, into a roll, a long optical functional film comprising a polarizing film, transversely cutting the optical functional films into sheet pieces of the optical functional films, and bonding the sheet pieces to both surfaces of a rectangular liquid crystal panel, comprising:

a film feeding step comprising feeding the optical functional films from the first and second continuous rolls using film feeding lines arranged in such a manner that the optical functional films being fed are linearly aligned with each other in planar view;

a panel feeding step comprising feeding the liquid crystal panel using a panel feeding line that is placed above the film feeding lines in an overlapping manner and placed to feed the liquid crystal panel linearly in planar view; and a panel turning step comprising turning over the liquid crystal panel about an axis neither parallel to a long side of the liquid crystal panel nor to a short side of the liquid crystal panel using a panel turning unit that is provided in the panel feeding line so that a positional relationship between the long and short sides of the liquid crystal panel can be reversed and that bonding of one of the sheet pieces of the optical functional films to the liquid crystal panel from below can be followed by bonding of another one of the sheet pieces of the optical functional films thereto from below.

It is preferable that the method is for manufacturing the liquid crystal display element by a process comprising feeding optical functional films and carrier films from first and second continuous rolls with different widths, respectively, which are each formed by winding, into a roll, a laminate comprising a carrier film and a long optical functional film comprising a polarizing film, transversely cutting the optical functional films into sheet pieces of the optical functional films, while leaving the carrier films uncut, peeling off the sheet pieces from the carrier films, and bonding the sheet pieces to both surfaces of the rectangular liquid crystal panel, wherein the film feeding lines are provided with first and second take-up rolls for taking up the carrier films having been fed from the first and second continuous rolls, respectively, after the sheet pieces of the optical functional films are peeled off from the carrier films, and the first take-up roll and the first continuous roll are arranged in this order along a direction parallel to the feeding direction of the liquid crystal panel in the panel feeding line, and the second take-up roll and the second continuous roll are arranged in this order along a direction parallel to the feeding direction of the liquid crystal panel in the panel feeding line.

An another method for manufacturing a liquid crystal display element according to the present invention relates to a method for manufacturing a liquid crystal display element by a process comprising feeding sheet pieces of optical functional films and carrier films from first and second continuous rolls with different widths, respectively, which are each formed by winding, into a roll, a laminate comprising a carrier film and sheet pieces of an optical functional film comprising a polarizing film, peeling off the sheet pieces of the optical functional films from the carrier films, and bonding the sheet pieces to both surfaces of a rectangular liquid crystal panel, comprising:

a film feeding step comprising feeding the optical functional films from the first and second continuous rolls using film feeding lines arranged in such a manner that the optical functional films being fed are linearly aligned with each other in planar view;

a panel feeding step comprising feeding the liquid crystal panel using a panel feeding line that is placed above the film feeding lines in an overlapping manner and placed to feed the liquid crystal panel linearly in planar view; and a panel turning step comprising turning over and horizontally rotating the liquid crystal panel using a panel turning unit that is provided in the panel feeding line so that bonding of one of the sheet pieces of the optical functional films to the liquid crystal panel from below can be followed by bonding of another one of the sheet pieces of the optical functional films thereto from below.

An another method for manufacturing a liquid crystal display element according to the present invention relates to a method for manufacturing a liquid crystal display element by a process comprising feeding sheet pieces of optical functional films and carrier films from first and second continuous rolls with different widths, respectively, which are each formed by winding, into a roll, a laminate comprising a carrier film and sheet pieces of an optical functional film comprising a polarizing film, peeling off the sheet pieces of the optical functional films from the carrier films, and bonding the sheet pieces to both surfaces of a rectangular liquid crystal panel, comprising:

a film feeding step comprising feeding the optical functional films from the first and second continuous rolls using film feeding lines arranged in such a manner that the optical functional films being fed are linearly aligned with each other in planar view;

a panel feeding step comprising feeding the liquid crystal panel using a panel feeding line that is placed above the film feeding lines in an overlapping manner and placed to feed the liquid crystal panel linearly in planar view; and a panel turning step comprising turning over the liquid crystal panel about an axis neither parallel to a long side of the liquid crystal panel nor to a short side of the liquid crystal panel using a panel turning unit that is provided in the panel feeding line so that a positional relationship between the long and short sides of the liquid crystal panel can be reversed and that bonding of one of the sheet pieces of the optical functional films to the liquid crystal panel from below can be followed by bonding of another one of the sheet pieces of the optical functional films thereto from below.

It is preferable that the film feeding lines are provided with first and second take-up rolls for taking up the carrier films having been fed from the first and second continuous rolls, respectively, after the sheet pieces of the optical functional films are peeled off from the carrier films, and the first take-up roll and the first continuous roll are arranged in this order along a direction parallel to the feeding direction of the liquid crystal panel in the panel feeding line, and the second take-up roll and the second continuous roll are arranged in this order along a direction parallel to the feeding direction of the liquid crystal panel in the panel feeding line.

It is preferable that the film feeding lines and the panel feeding line are placed in a partition structure.

BRIEF DESCRIPTION OF THE DRAWINGS

FIG. 1 is a flow chart showing an example of the liquid crystal display element manufacturing method according to an embodiment of the invention;

FIGS. 6A to 6D are schematic diagrams showing specific examples of the liquid crystal panel turning method;

FIGS. 8A(a) and 8A(b) are schematic plan views showing examples of the manufacturing line configuration;

FIGS. 8B(a) and 8B(b) are schematic plan views showing examples of the manufacturing line configuration;

DETAILED DESCRIPTION OF THE PREFERRED EMBODIMENTS

Figure 2A:
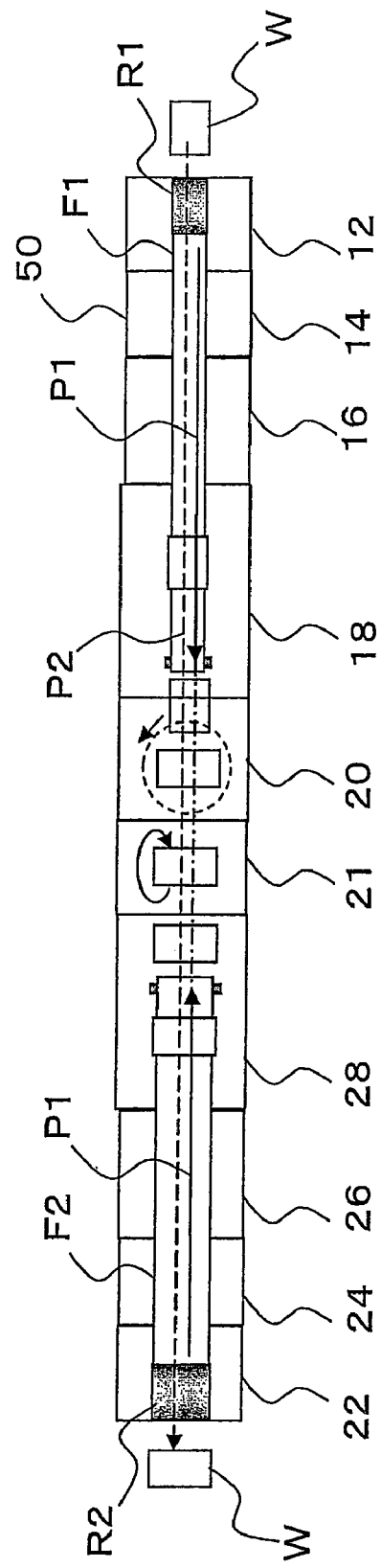
FIG. 2A is a schematic plan view showing an example of the liquid crystal display element manufacturing system.
Figure 2B:
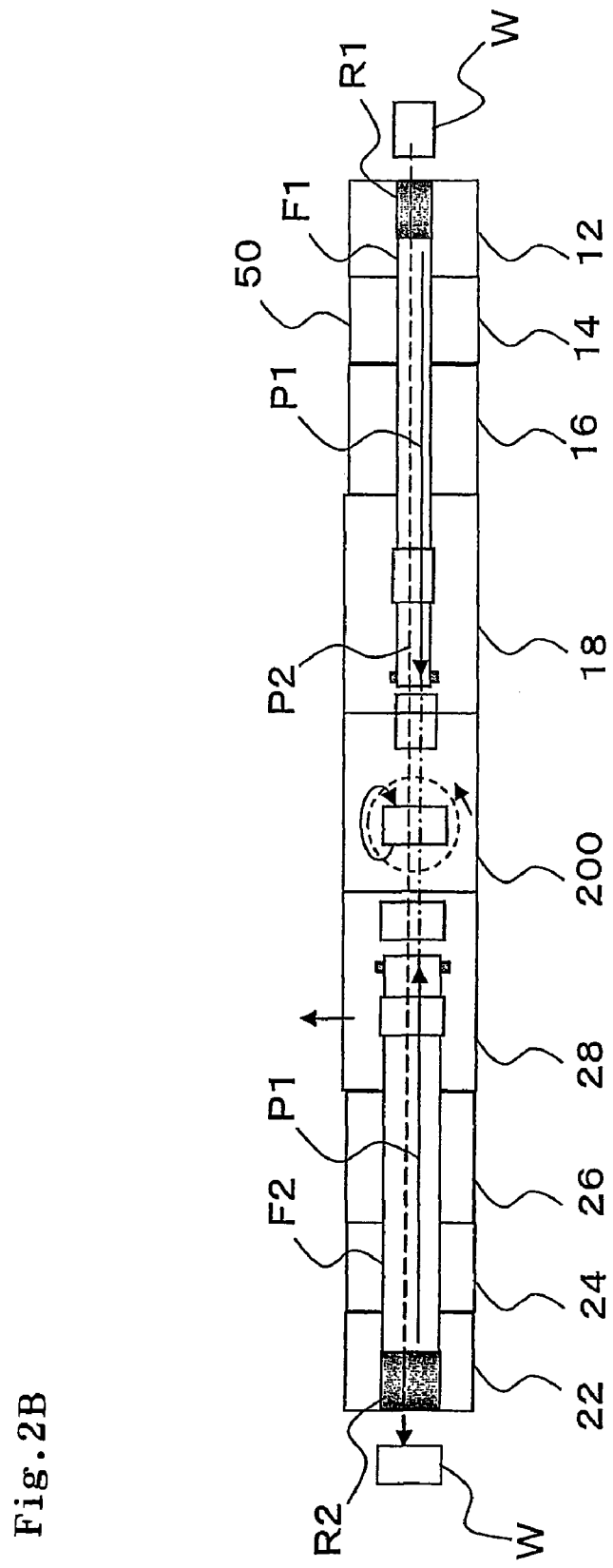
FIG. 2B is a schematic plan view showing another example of the liquid crystal display element manufacturing system.
Figure 3:
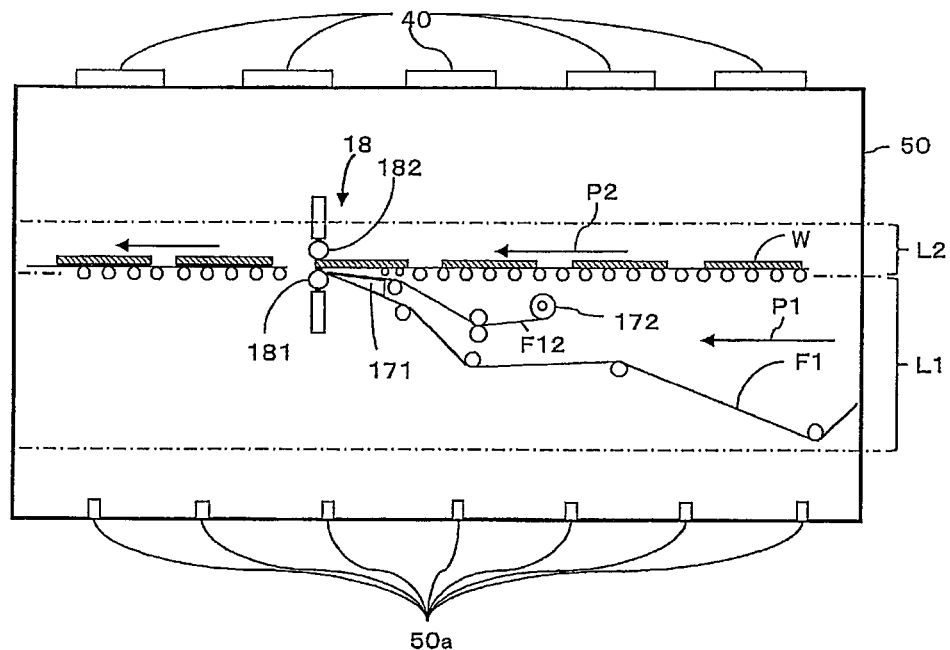
FIG. 3 is a schematic side view showing a process of bonding a first optical functional film to a liquid crystal panel.
Figure 4:
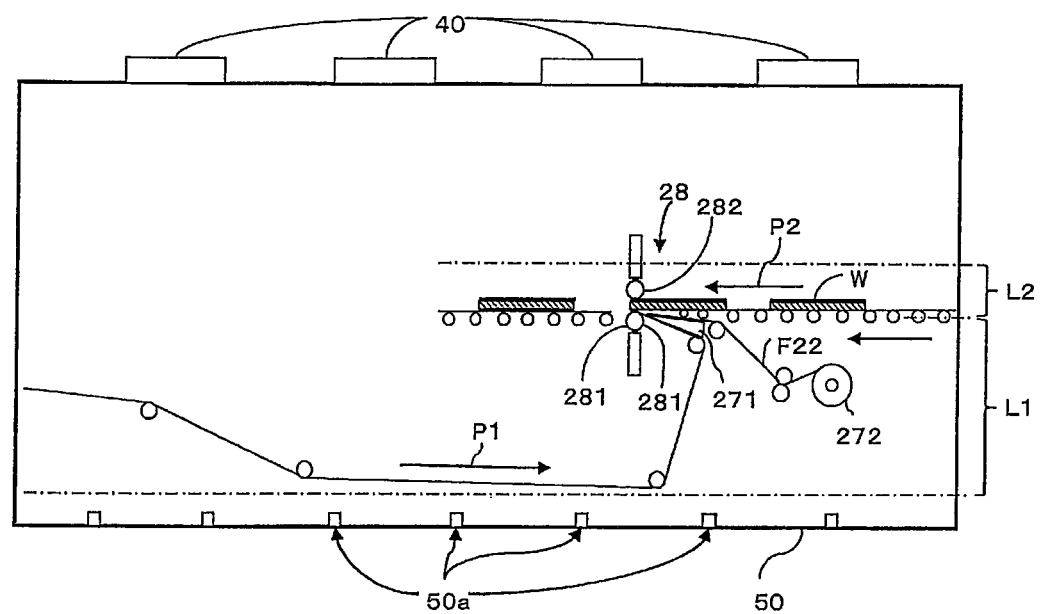
FIG. 4 is a schematic side view showing a process of bonding a second optical functional film to the liquid crystal panel.

FIG. 1 is a flow chart showing an example of the liquid crystal display element manufacturing method according to an embodiment of the invention. FIG. 2A is a schematic plan view showing an example of the liquid crystal display element manufacturing system. FIG. 2B is a schematic plan view shown another example of the liquid crystal display element manufacturing system. FIG. 3 is a schematic side view showing a process of bonding a first optical film F11 to a liquid crystal panel W. FIG. 4 is a schematic side view showing a process of bonding a second optical functional film F21 to the liquid crystal panel W.

Liquid Crystal Panel

The liquid crystal panel W for use in the liquid crystal display element manufactured according to the invention is typically a glass substrate unit including a pair of glass substrates and a liquid crystal placed therebetween. The liquid crystal panel W has a rectangular shape.

Optical Functional Film

The optical functional film for use in the liquid crystal display element manufactured according to the invention includes a polarizing film. A pressure-sensitive adhesive layer is formed on one side of the optical functional film so that it can be bonded to the liquid crystal panel W, and a carrier film for protecting the pressure-sensitive adhesive layer is also provided thereon. Namely, the optical functional film, the pressure-sensitive adhesive layer, and the carrier film are stacked in this order. A surface protecting film is provided on the other side of the optical functional film with a pressure-sensitive adhesive layer interposed therebetween. Hereinafter, the laminate of the surface protecting film, the optical functional film, and the carrier film is also referred to as an optical film laminate.

Figure 5:
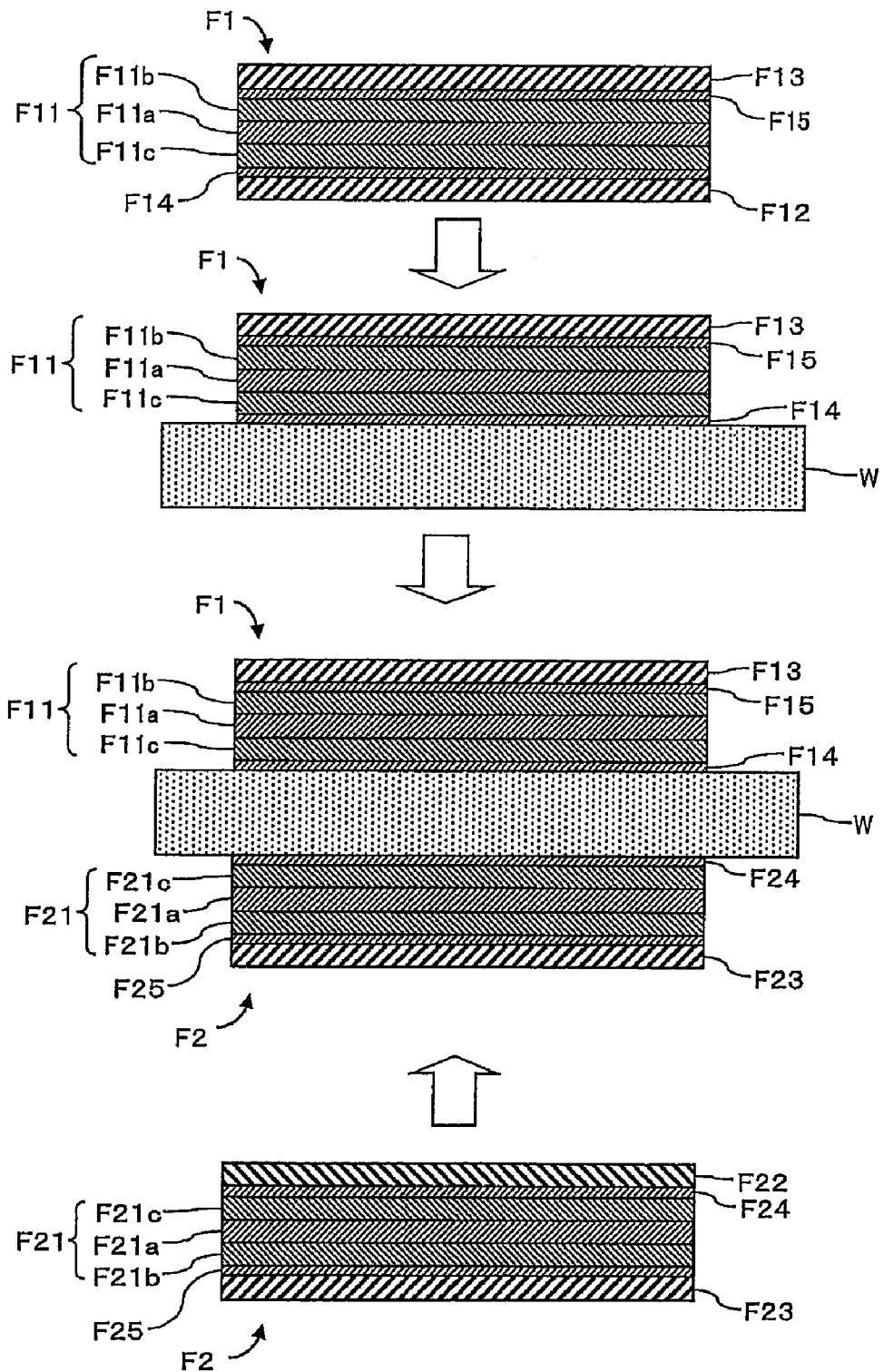
FIG. 5 is a cross-sectional view showing an example of the process of bonding optical functional films to a liquid crystal panel.

FIG. 5 is a cross-sectional view showing an example of the process of bonding the optical functional film to the liquid crystal panel W. In this embodiment, first and second optical film laminates F1 and F2 are used. The first optical film laminate F1 includes a first optical functional film F11 which is to be bonded to one surface of the liquid crystal panel W, and the second optical film laminate F2 includes a second optical functional film F21 which is to be bonded to the other surface of the liquid crystal panel W.

The first optical film laminate F1 has a structure in which the first optical functional film F11, a first carrier film F12 and a surface protecting film F13 are stacked. In this embodiment, the first optical functional film F11 includes a polarizing film. The first optical functional film F11 includes a first polarizer F11a, a first film F11b bonded to one side thereof with an adhesive layer (not shown) interposed therebetween, and a second film F11c bonded to the other side thereof with an adhesive layer (not shown) interposed therebetween. The first polarizer F11a is typically formed by stretching a polyvinyl alcohol (PVA) film. It will be understood that the first polarizer F11a may be formed using any other film than the polyvinyl alcohol film.

The first and second films F11b and F11c are each typically a protective film (such as a triacetylcellulose film or a PET film). The second film F11c will be bonded to the liquid crystal panel W with a first pressure-sensitive adhesive layer F14 interposed therebetween. The first film F11b may be subjected to a surface treatment. For example, the surface treatment may be a hard coating treatment, an antireflection treatment, or a treatment for any other purpose such as an anti-sticking, diffusion, or antiglare purpose. The first carrier film F12 is bonded to the second film F11c with the first pressure-sensitive adhesive layer F14 interposed therebetween. The surface protecting film F13 is bonded to the first film F11b with a pressure-sensitive adhesive layer F15 interposed therebetween.

The laminated structure of the second optical film laminate F2 is the same as, but not limited to, that of the first optical film laminate F1. The second optical film laminate F2 has a structure in which a second optical functional film F21, a second carrier film F22, and a surface protecting film F23 are stacked. In this embodiment, the second optical functional film F21 includes a polarizing film. The second optical functional film F21 includes a second polarizer F21a, a third film F21b bonded to one side thereof with an adhesive layer (not shown) interposed therebetween, and a fourth film F21c bonded to the other side thereof with an adhesive layer (not shown) interposed therebetween. The second polarizer F21a is typically formed by drying a polyvinyl alcohol (PVA) film. It will be understood that the second polarizer F21a may be formed using any other film than the polyvinyl alcohol film.

The third and fourth films F21b and F21c are each typically a protective film (such as a triacetylcellulose film or a PET film). The fourth film F21c will be bonded to the liquid crystal panel W with a second pressure-sensitive adhesive layer F24 interposed therebetween. The third film F21b may be subjected to a surface treatment. For example, the surface treatment may be a hard coating treatment, an antireflection treatment, or a treatment for any other purpose such as an anti-sticking, diffusion, or antiglare purpose. The second carrier film F22 is bonded to the fourth film F21c with the second pressure-sensitive adhesive layer F24 interposed therebetween. The surface protecting film F23 is bonded to the third film F21b with a pressure-sensitive adhesive layer F25 interposed therebetween.

Manufacturing Flow Chart (1) Step of Providing First Continuous Roll (S1 in FIG. 1). A first continuous roll R1 is provided which is formed by winding a first long optical film laminate F1 into a roll. The first continuous roll R1 has a width depending on the size of the liquid crystal panel W to be bonded. Specifically, the first continuous roll R1 is formed by winding, into a roll, a first optical film laminate F1 including a first optical functional film F11 with a width corresponding to the short or long side of the liquid crystal panel W. More specifically, the first continuous roll R1 is formed by winding, into a roll, the first long optical film laminate F1 that is obtained by slitting, into a width corresponding to the short or long side of the liquid crystal panel W, a long material including the first optical functional film F11, the first pressure-sensitive adhesive layer F14, and the first carrier film F12 stacked in this order. The polarizing film as a component of the long material is preferably formed through stretching in the longitudinal direction, and in such a case, the absorption axis of the polarizing film is formed along the longitudinal direction. Such a long material should be slit parallel to the longitudinal direction so that the first optical film laminate F1 formed can have an absorption axis extending along the longitudinal direction with high accuracy. In this embodiment, the first continuous roll R1 used has a width corresponding to the short side of the liquid crystal panel W.

(2) Step of Feeding First Optical Functional Film (S2 in FIG. 1). A first feeder 12 draws and feeds the first optical film laminate F1 including the first optical functional film F11 to the downstream side from the first continuous roll R1 provided and placed. The first optical film laminate F1 is fed from the first continuous roll R1 linearly in planar view.

(3) First Inspection Step (S3 in FIG. 1). The first optical film laminate F1 is inspected for defects using a first defect inspection apparatus 14. In this step, the defect inspection method may be a method of performing imaging and image processing on both sides of the first optical film laminate F1 with transmitted light or reflected light, a method of performing imaging and image processing with a polarizing film for inspection arranged in a crossed nicols relationship (also referred to as "0° cross") with the polarization axis of the polarizing film (the object to be inspected) between a CCD camera and the object, or a method of performing imaging and image processing with a polarizing film for inspection arranged at a certain angle (for example, in the range of more than 0° to 10°, also referred to as "X° cross") with the polarization axis of the polarizing film (the object to be inspected) between a CCD camera and the object. Known methods may be used for the image processing algorithm. For example, defects may be detected by grayscale determination based on binarization.

Defect information detected by the first defect inspection apparatus 14 is associated with the positional information (such as position coordinates) and sent to a controller so that it can contribute to the cutting process with a first cutting apparatus 16.

(4) First Cutting Step (S4 in FIG. 1). The first cutting apparatus 16 cuts, in the transverse direction, at least the first optical functional film F11 of the first optical film laminate F1 drawn from the first continuous roll R1, so that a sheet piece of the first optical functional film F11 is formed. In this example, while the first carrier film F12 is left uncut, the first optical functional film F11, to which the first carrier film F12 is attached, and the surface protecting film F13, to which the first optical functional film F11 is attached, are cut into a predetermined size. It will be understood that such a process is non-limiting, and alternatively, for example, the first optical film laminate F1 may be cut completely so that a piece of the first optical film laminate F1 can be formed. For example, the cutting means may be a laser, a cutter, or the like. The cutting is preferably performed based on the defect information detected by the first defect inspection apparatus 14 so that defects can be avoided. This significantly increases the first optical film laminate F1 yield. Defective parts of the first optical film laminate F1 are removed by a first removing apparatus (not shown) so as not to be bonded to the liquid crystal panel W. In this embodiment, the first optical functional film F11 is cut into a length corresponding to the long side of the liquid crystal panel W. Alternatively, however, it may be cut into a length corresponding to the short side of the liquid crystal panel W when the first continuous roll R1 has a width corresponding to the long side of the liquid crystal panel W.

All of the step of providing the first continuous roll, the first inspection step, and the first cutting step are preferably performed in a continuous manufacturing line. In the above series of manufacturing steps, a sheet piece of the first optical functional film F11 is formed, which is to be bonded to one surface of the liquid crystal panel W. A description is given below of a process of forming a sheet piece of the second optical functional film F21 to be bonded to the other surface of the liquid crystal panel W.

(5) Step of Providing Second Continuous Roll (S11 in FIG. 1). A second continuous roll R2 is provided which is formed by winding a second long optical film laminate F2 into a roll. The second continuous roll R2 has a width depending on the size of the liquid crystal panel W to be bonded. Specifically, the second continuous roll R2 is formed by winding, into a roll, a second optical film laminate F2 including a second optical functional film F21 with a width corresponding to the long or short side of the liquid crystal panel W. More specifically, the second continuous roll R2 is formed by winding, into a roll, the second long optical film laminate F2 that is obtained by slitting, into a width corresponding to the long or short side of the liquid crystal panel W, a long material including the second optical functional film F21, the second pressure-sensitive adhesive layer F24, and the second carrier film F22 stacked in this order. The polarizing film as a component of the long material is preferably formed through stretching in the longitudinal direction, and in such a case, the absorption axis of the polarizing film is formed along the longitudinal direction. Such a long material should be slit parallel to the longitudinal direction so that the second optical film laminate F2 formed can have an absorption axis extending along the longitudinal direction with high accuracy. The second continuous roll R2 is typically formed with a width different from that of the first continuous roll R1. Specifically, when the first continuous roll R1 is formed with a width corresponding to the long side of the liquid crystal panel W, the second continuous roll R2 is formed with a width corresponding to the short side of the liquid crystal panel W, and when the first continuous roll R1 is formed with a width corresponding to the short side of the liquid crystal panel W, the second continuous roll R2 is formed with a width corresponding to the long side of the liquid crystal panel W. In this embodiment, the second continuous roll R2 used has a width corresponding to the long side of the liquid crystal panel W. As used herein, the expression "corresponding to the long or short side of the liquid crystal panel W" means that the bonding length of the optical functional film F11 or F21 (exclusive of the length of the exposed portion) will correspond to the length of the long or short side of the liquid crystal panel W and in not necessary to mean that the width of the optical functional film F11 or F12 has to be equal to the length of the long or short side of the liquid crystal panel W.

(6) Step of Feeding Second Optical Functional Film (S12 in FIG. 1). A second feeder 22 draws and feeds the second optical film laminate F2 including the second optical functional film F21 to the downstream side from the second continuous roll R2 provided and placed. The second optical film laminate F2 is fed from the second continuous roll R2 linearly in planar view. More specifically, as shown in FIGS. 2A and 2B, the first and second optical film laminates F1 and F2 are fed from the first and second continuous rolls R1 and R2, respectively, on first linear feed paths P1 whose extended lines overlap each other in planar view (the film feeding step). The first and second optical film laminates F1 and F2 may be fed in directions opposite to each other or in the same direction on the first linear feed paths P1. In this embodiment, the liquid crystal display element manufacturing system includes film feeding line L1 that are arranged so that the first and second optical film laminates F1 and F2 being fed can be linearly aligned with each other in planar view as described above (see FIGS. 3 and 4).

(7) Second Inspection Step (S13 in FIG. 1). The second optical film laminate F2 is inspected for defects using a second defect inspection apparatus 24. In this step, the defect inspection method is the same as the above method with the first defect inspection apparatus 14. However, the first inspection step (S3) and the second inspection step (S13) may be omitted. In such a case, the first and second optical film laminates F1 and F2 may be inspected for defects in a stage where the first and second continuous rolls R1 and R2 are manufactured, and liquid crystal display elements may be manufactured using the first and second continuous rolls R1 and R2 to which the defect information detected by the defect inspection has been attached.

(8) Second Cutting Step (S14 in FIG. 1). A second cutting apparatus 26 cuts, in the transverse direction, at least the second optical functional film F21 of the second optical film laminate F2 drawn from the second continuous roll R2, so that a sheet piece of the second optical functional film F21 is formed. In this example, while the second carrier film F22 is left uncut, the second optical functional film F21, to which the second carrier film F22 is attached, and the surface protecting film F23, to which the second optical functional film F21 is attached, are cut into a predetermined size. It will be understood that such a process is non-limiting, and alternatively, for example, the second optical film laminate F2 may be cut completely so that a piece of the second optical film laminate F2 can be formed. For example, the cutting means may be a laser, a cutter, or the like. The cutting is preferably performed based on the defect information detected by the second defect inspection apparatus 24 so that defects can be avoided. This significantly increases the second optical film laminate F2 yield. Defective parts of the second optical film laminate F2 are removed by a second removing apparatus (not shown) so as not to be bonded to the liquid crystal panel W. In this embodiment, the second optical functional film F21 is cut into a length corresponding to the short side of the liquid crystal panel W. Alternatively, however, it may be cut into a length corresponding to the long side of the liquid crystal panel W when the second continuous roll R2 has a width corresponding to the short side of the liquid crystal panel W.

The step of feeding the liquid crystal panel W is performed in parallel with the step of forming sheet pieces of the first and second optical functional films F11 and F21, respectively. The liquid crystal panel W is subjected to the process described below while it is fed.

(9) Cleaning Step (S6 in FIG. 1). The surface of the liquid crystal panel W is cleaned by polishing cleaning, washing with water, or any other cleaning method. As shown in FIGS. 3 and 4, the liquid crystal panel W having undergone cleaning is fed on a second linear feed path P2 in a panel feeding line L2 that is placed above the film feeding line L1 in an overlapping manner and placed to feed the liquid crystal panels W linearly in planar view (the panel feeding step). The second linear feed path P2 extends at least between first and second bonding apparatuses 18 and 28 and placed parallel to the first linear feed paths P1 so as to at least partially overlap with the first linear feed paths P1 in planar view.

(10) Step of Bonding First Optical Functional Film (S5 in FIG. 1). The cut piece of the first optical functional film F11 (the sheet piece of the first optical functional film F11) is bonded to one surface of the liquid crystal panel W with the pressure-sensitive adhesive layer F14 interposed therebetween by the first bonding apparatus 18, while the first carrier film F12 is peeled off. The first carrier film F12 peeled off by a peeling unit 171 is wound onto a first take-up roll 172. In the bonding, the first optical functional film F11 and the liquid crystal panel W are inserted and press-bonded between a pair of rollers 181 and 182 opposed to each other.

(11) Step of Transporting and Feeing Panel (S7 in FIG. 1). The liquid crystal panel W to which the sheet piece of the first optical functional film F11 has been bonded by the first bonding apparatus 18 is fed to a second bonding apparatus 28 along the second linear feed path P2. The panel feeding line L2 is provided with a panel turning unit for turning the liquid crystal panel W on the second linear feed path P2 after the sheet piece of the first optical functional film F11 is bonded thereto and before a sheet piece of the second optical functional film F21 is bonded thereto. The panel turning unit turns over the liquid crystal panel W and rotates it horizontally by 90° (the panel turning step) to allow the first and second optical functional films F11 and F21 to be bonded in a crossed nicols relationship (in such a relationship that the absorption axes of the polarizing films are perpendicular to each other).

In the example shown in FIG. 2A, the panel turning unit includes a panel rotating mechanism 20 for horizontally rotating the liquid crystal panel W and a panel-turning-over mechanism 21 for turning over the liquid crystal panel W. In other words, it is configured so that turning over the liquid crystal panel W and rotating it horizontally can be performed independently. The panel rotating mechanism 20 and the panel-turning-over mechanism 21 may be placed in any order. On the other hand, the example shown in FIG. 2B includes a panel turning unit 200 that is configured so that turning over the liquid crystal panel W and rotating it horizontally can be performed at the same time.

FIG. 6 is a schematic diagram showing examples of the method of turning the liquid crystal panel W. FIGS. 6A and 6B show methods of turning over the liquid crystal panel W to achieve a crossed nicols relationship, in which the liquid crystal panel W is turned over (obliquely turned over) about an axis (axis A1 or A2), which is neither parallel to the long side of the liquid crystal panel W nor to the short side of the liquid crystal panel W, so that the positional relationship between the long and short sides of the liquid crystal panel W can be reversed. FIG. 6A shows an example where the liquid crystal panel W is turned over about the horizontal axis A1 passing through a corner of the liquid crystal panel W. FIG. 6B shows an example where the liquid crystal panel W is turned over about the horizontal axis A2 passing through the center of the liquid crystal panel W. In both of FIGS. 6A and 6B, for example, the axes A1 and A2 are inclined by 45° relative to the feeding direction of the liquid crystal panel W. FIG. 6C shows a method of performing turning over and horizontal rotation independently to achieve a crossed nicols relationship, in which turning over and horizontal rotation may be performed in any order. FIG. 6D shows a method that includes horizontally rotating the liquid crystal panel W, while turning it over, which is performed using a panel turning unit including a mechanism for rotating the liquid crystal panel W horizontally and a mechanism for turning over the liquid crystal panel W about a horizontal axis A3.

In the example shown in FIG. 6(a), the liquid crystal panel W, which has been turned over around the axis A1, is displaced in the transverse direction of the line, while it is transported through the panel feeding line L2 to the panel turning unit 200. In an embodiment of the invention, the displaced liquid crystal panel W being transported may be shifted back to a position on an extension of the initial panel feeding line L2 or may be continuously transported from the displaced position through another part of the feeding line L2 shifted in the transverse direction of the line in the feed path. The latter case corresponds to such an arrangement that the liquid crystal panel W can be transported through a feed path that is composed of plural linear feed lines connected along a straight line and displaced in the transverse direction so that the object can be continuously transported while being shifted in the transverse direction of the line, which falls within the meaning of the expression "arranged . . . linearly in planar view" used herein.

The operation of the panel turning unit described above makes it possible to reverse the positional relationship between the long and short sides of the liquid crystal panel W. Specifically, the long side of the liquid crystal panel W after the operation is parallel to the short side before the operation, and the short side of the liquid crystal panel W after the operation is parallel to the long side before the operation. It will be understood that the operation of the panel turning unit is not limited to those shown in FIG. 6 and the liquid crystal panel W may be turned in any other manner.

In the embodiment, after the first optical functional film F11 is bonded to the liquid crystal panel W in the first bonding apparatus 18, the liquid crystal panel W is turned to the bonding direction in the second bonding apparatus 28. Alternatively, however, the second optical functional film F21 may be bonded to the liquid crystal panel W before the first optical functional film F11 is bonded thereto as mentioned above. In such a case, after the second optical functional film f21 is bonded to the liquid crystal panel W in the second bonding apparatus 28, the liquid crystal panel W may be turned to the bonding direction in the first bonding apparatus 18.

(12) Step of Bonding Second Optical Functional Film (S15 in FIG. 1). The cut piece of the second optical functional film F21 (the sheet piece of the second optical functional film F21) is bonded to the other surface of the liquid crystal panel W with the pressure-sensitive adhesive layer F24 interposed therebetween by the second bonding apparatus 28, while the second carrier film F22 is peeled off. The second carrier film F22 peeled off by a peeling unit 271 is wound onto a second take-up roll 272. In the bonding, the second optical functional film F21 and the liquid crystal panel W are inserted and press-bonded between a pair of rollers 281 and 282 opposed to each other.

(13) Step of Inspecting Liquid Crystal Panel (S16 in FIG. 1). The liquid crystal panel W with both surfaces bonded to the optical functional films F11 and F12 is inspected using an inspection apparatus. An example of the inspection method is a method of performing imaging and image processing on both sides of the liquid crystal panel W with transmitted light and reflected light. Another example of the method uses a polarizing film for inspection placed between a CCD camera and the object to be inspected. Known methods may be used for the image processing algorithm. For example, defects may be detected by grayscale determination based on binarization.

(14) Defect information detected by the inspection apparatus is used to determine whether the liquid crystal panel W is non-defective. The liquid crystal panel W determined to be non-defective is transferred to the next implementing step. When determined to be defective, it is subjected to a reworking process, in which a new optical functional film F11 or F21 is bonded, and then the product is inspected. The product determined to be non-defective is transferred to the implementing step, but the product determined to be defective is subjected to the reworking process again or to disposal.

In the above series of manufacturing steps, the first optical functional film F11 bonding step and the second optical functional film F21 bonding step may be performed in a continuous manufacturing line, which makes it possible to manufacture the liquid crystal display element in a satisfactory manner.

A description has been given of a method that includes leaving the carrier films F12 and F22 uncut and cutting other components of the optical film laminates F1 and F2 (half-cutting method). However, such a method is non-limiting, and alternatively, for example, continuous rolls having undergone half-cutting may be used, in which sheet pieces of the optical functional films F11 and F21 formed by previously cutting the other components of the optical film laminates F12 and F22 than the carrier films F12 and F22 are held on the carrier films F12 and F22, respectively. In this case, the continuous rolls may be formed by a process that includes slitting a long material into a width corresponding to the short or long side of the rectangular liquid crystal panel W, cutting the optical functional films F11 and F21 and the pressure-sensitive adhesive layers F14 and F24 of the resulting long optical film laminates F1 and F2, respectively, into a length corresponding to the long or short side of the liquid crystal panel W, while leaving the carrier films F12 and F22 uncut, and winding, into rolls, the laminates F1 and F2 having undergone the cutting, respectively. The optical film laminates F1 and F2 are drawn from such continuous rolls, respectively, and the sheet pieces of the optical functional films F11 and F21 are bonded to the surfaces of the liquid crystal panel W with the pressure-sensitive adhesive layers F14 and F24 interposed therebetween, respectively, while the carrier films F12 and F22 are peeled off, so that a liquid crystal display element is manufactured. The optical functional films F11 and F21 do not always have to be bonded after they are cut, and the cutting may be performed during or after the bonding.

Figure 7:
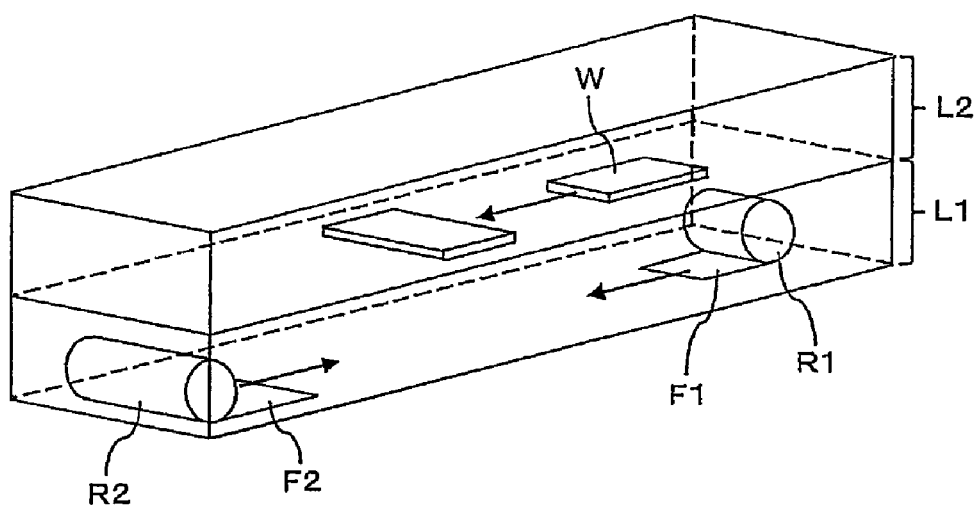
FIG. 7 is a schematic perspective view showing the positional relationship between a panel feeding line and film feeding lines.

FIG. 7 is a schematic perspective view showing the positional relationship between the film feeding line L1 and the panel feeding line L2. In this embodiment, also shown in FIG. 7, the liquid crystal panel W is turned by the panel turning unit, which makes it possible to feed the optical functional films F11 and F21 in the film feeding line L1 arranged in such a manner that the optical functional films F11 and F21 being fed from the first and second continuous rolls R1 and R2 can be linearly aligned in planar view, and also makes it possible to feed the liquid crystal panel W in the panel feeding line L2 that is placed above the film feeding line L1 in an overlapping manner and formed linearly in planar view. In other words, the optical functional films F11 and F21 and the liquid crystal panel W are fed along the film feeding line L1 and the panel feeding line L2, which extend linearly in planar view, so that the manufacturing line can have an I-shape as shown in FIGS. 2A and 2B. Such an I-shaped manufacturing line can be installed in a more compact space than an L-shaped manufacturing line or the like.

Particularly, in this embodiment, the panel feeding line L2 is placed above the film feeding line L1, and the optical functional films F11 and F21 drawn from the first and second continuous rolls R1 and R2, respectively, are each bonded to the liquid crystal panel W from below. This feature makes it possible to prevent foreign bodies from falling on the liquid crystal panel W surface to be bonded, so that the bonding can be performed in a satisfactory manner.

The length of the panel turning unit can be made shorter and therefore the installation space can be further made smaller, when, as shown in FIGS. 6A and 6B, the liquid crystal panel W is turned over about an axis (axis A1 or A2) not parallel to the long or short side of the liquid crystal panel W so that the positional relationship between the long and short sides of the liquid crystal panel W can be reversed or when, as shown in FIG. 6D, turning over the liquid crystal panel W and rotating it horizontally are performed at the same time than when, as shown in FIG. 6C, turning over the liquid crystal panel W and rotating it horizontally are performed independently. This advantageous effect will be more remarkable when the liquid crystal display is horizontally upsized. In particular, the configurations illustrated in FIGS. 6A and 6B can achieve the same effect through a single operation as in the case where turning over the liquid crystal panel W and rotating it horizontally are performed independently.

In this embodiment, the manufacturing line is entirely placed in a partition structure 50. Therefore, the film feeding line L1 and the panel feeding line L2 are placed in the partition structure 50, so that contamination with foreign bodies from the outside can be prevented and that the bonding can be performed in a more satisfactory manner. For example, the partition structure 50 may be formed by assembling transparent plates into a box-shaped structure.

In this embodiment, air circulation apparatuses 40 for circulating air in the partition structure 50 are provided at the top of the partition structure 50. In this embodiment, the air circulation apparatuses 40 blow air into the partition structure 50, and the blown air is allowed to flow from the upper side to the lower side in the partition structure 50 and discharged from openings 50a formed at the bottom of the partition structure 50. Thus, the air is circulated in the partition structure 50 to keep the inside of the partition structure 50 clean. When air is circulated in the partition structure 50 as described above, an I-shaped manufacturing line such as that according to this embodiment can produce better air flow than an L-shaped manufacturing line or the like. Thus, dust retention is prevented so that the cleanliness of the continuous rolls R1 and R2 and the liquid crystal panel W can be kept high during manufacture, and the temperature and humidity conditions can be controlled well during manufacture.

EXAMPLES

A description is given below of the results of measuring the rate of occurrence of foreign bodies in liquid crystal display elements that were manufactured by bonding optical functional films F11 and F21 to the liquid crystal cell W using manufacturing lines having different shapes (such as I-, L-, and H-shapes) in planar view and different internal structures. The liquid crystal panel W used was a 40-inch panel, which is a typical large panel (such as a panel of 32 inches or more).

FIGS. 8A and 8B are schematic plan views showing examples of the manufacturing line configuration. FIGS. 8A(a) and 8(b) show an I-shaped manufacturing line (linear line structure) having a similar configuration to that in the above embodiment, in which the optical functional films F11 and F21 drawn from the first and second continuous rolls R1 and R2, respectively, are fed on first linear feed paths P1 whose extended lines overlap with each other in planar view, and the liquid crystal panel W is fed on a second linear feed path P2 at least partially overlapping with the first linear feed paths P1 in planar view. In FIG. 8A(a), the optical functional films F11 and F21 are fed in opposite directions. On the other hand, in FIG. 8A(b), the optical films F11 and F21 are fed in the same direction, which coincides with the direction of feeding of the liquid crystal panel W. When the directions of feeding of the optical functional films F11 and F21 and the liquid crystal panel W are all the same as shown in FIG. 8A(b), the consecutive steps can be easily linked to each other, and the positions where the continuous rolls R1 and R2 are placed and the mechanisms for feeding the optical functional films F11 and F21 can be all located on the lower side, which makes it possible to further save the space.

FIG. 8B(a) shows an L-shaped manufacturing line, in which feed paths P11 for the optical functional films F11 and F21 drawn from the first and second continuous rolls R1 and R2 are perpendicular to each other in planar view, and the liquid crystal panel W is fed on a feed path P12 having an L-shape in planar view. FIG. 8B(b) shows an H-shaped manufacturing line, in which feed paths P21 for the optical functional films F11 and F21 drawn from the first and second continuous rolls R1 and R2 extend parallel to each other in planar view, and the liquid crystal panel W is fed on a feed path P22 that lies across the feed paths P21 and has a U-shape in planar view. In the configurations shown in FIGS. 8A(a) and 8A(b) and FIG. 8B(b), the liquid crystal panel W has to be horizontally rotated so that the optical functional films F11 and F21 can be bonded in a crossed nicols relationship. In the configuration shown in FIG. 8B(a), however, there is no need to rotate the liquid crystal panel W horizontally.

Example 1

In Example 1, an I-shaped manufacturing line as shown in FIG. 8A(a) was used, and turning over the liquid crystal panel W and rotating it horizontally were independently performed in the same manner as shown in FIG. 6C, when the optical functional films F11 and F21 were each bonded to the liquid crystal panel W from below. The manufacturing line had a length W1 of 30.0 m, a width W2 of 2.0 m, a bonding region installation area of 60.0 m², and a bonding region line length of 30.0 m. The rate of liquid crystal display elements determined to be defective due to the occurrence of foreign bodies was 1.2% per 100 liquid crystal display elements manufactured using this manufacturing line.

Example 2

In Example 2, an I-shaped manufacturing line as shown in FIG. 8A(a) was used, and in the same manner as shown in FIG. 6A or 6B, the liquid crystal panel W was turned over (obliquely turned over) about an axis (axis A1 or A2) not parallel to the long or short side of the liquid crystal panel W so that the positional relationship between the long and short sides of the liquid crystal panel W could be reversed, when the optical functional films F11 and F21 were each bonded to the liquid crystal panel W from below. The manufacturing line had a length W1 of 28.0 m, a width W2 of 2.0 m, a bonding region installation area of 56.0 m², and a bonding region line length of 28.0 m. This manufacturing line can achieve the same effect through a single operation as in the case where turning over the liquid crystal panel W and rotating it horizontally are performed independently. In this manufacturing line, therefore, the length W1 is 2.0 m shorter than that in Example 1 where turning over and horizontal rotation are performed independently. The rate of liquid crystal display elements determined to be defective due to the occurrence of foreign bodies was 1.1% per 100 liquid crystal display elements manufactured using this manufacturing line. It is considered that a similar result can be obtained also when turning over the liquid crystal panel W and rotating it horizontally are performed at the same time as shown in FIG. 6D.

Comparative Example 1

In Comparative Example 1, an L-shaped manufacturing line as shown in FIG. 8B(a) was used, and turning over the liquid crystal panel W was only performed without rotating it horizontally, when the optical functional films F11 and F21 were each bonded to the liquid crystal panel W from below. The manufacturing line had a length W1 of 12.5 m, a width W2 of 12.5 m, a bonding region installation area of 156.3 m², and a bonding region line length of 23.0 m. The rate of liquid crystal display elements determined to be defective due to the occurrence of foreign bodies was 4.5% per 100 liquid crystal display elements manufactured using this manufacturing line, and the rate of occurrence of foreign bodies was found to be relatively high.

Comparative Example 2

In Comparative Example 2, an H-shaped manufacturing line as shown in FIG. 8B(b) was used, and horizontal rotation of the liquid crystal panel W was only performed without turning it over, when one of the optical functional films F11 and F21 was bonded to the liquid crystal panel W from above and the other was bonded thereto from below. The manufacturing line had a length W1 of 15.0 m, a width W2 of 7.0 m, a bonding region installation area of 105.0 m², and a bonding region line length of 35.0 m. The rate of liquid crystal display elements determined to be defective due to the occurrence of foreign bodies was 6.9% per 100 liquid crystal display elements manufactured using this manufacturing line, and the rate of occurrence of foreign bodies was found to be relatively high.

Comparative Example 3

In Comparative Example 3, an L-shaped manufacturing line as shown in FIG. 8B(a) was used, and neither turning over the liquid crystal panel W nor rotating it horizontally was performed, when one of the optical functional films F11 and F21 was bonded to the liquid crystal panel W from above and the other was bonded thereto from below. The manufacturing line had a width W1 of 12.5 m, a length W2 of 14.0 m, a bonding region installation area of 175.0 m², and a bonding region line length of 24.5 m. In this manufacturing line, the optical functional films F11 and F21 are bonded in different directions (from above or below) to the liquid crystal panel W, and therefore, an extra space is necessary for running of the optical functional films F11 and F21. In this manufacturing line, therefore, W2 is 1.5 m longer than that in Comparative Example 1. The rate of liquid crystal display elements determined to be defective due to the occurrence of foreign bodies was 7.6% per 100 liquid crystal display elements manufactured using this manufacturing line, and the rate of occurrence of foreign bodies was found to be relatively high.

Table 1 shows the results of measuring the rate of occurrence of foreign bodies as described above.

TABLE 1

| | Turnover/rotation type | Bonding direction | Installation area (only bonding region) [m²] | Bonding region line length (m) | Rate of occurrence of foreign bodies (the number of products with foreign bodies/100) [%] | W1[m] | W2[m] |
|---|---|---|---|---|---|---|---|
| Example 1 | Independent turnover and rotation (I-shaped) | Both bonded from below | 60.0 | 30.0 | 1.2 | 30.0 | 2.0 |
| Example 2 | Oblique turnover (I-shaped) | Both bonded from below | 56.0 | 28.0 | 1.1 | 28.0 | 2.0 |
| Comparative Example 1 | Turnover without rotation (L-shaped) | Both bonded from below | 156.3 | 23.0 | 4.5 | 12.5 | 12.5 |
| Comparative Example 2 | Rotation without turnover (H-shaped) | Bonded from above and below | 105.0 | 35.0 | 6.9 | 15.0 | 7.0 |
| Comparative Example 3 | Neither turnover nor rotation (L-shaped) | Bonded from above and below | 175.0 | 24.5 | 7.6 | 12.5 | 14.0 |

Figure 9A:
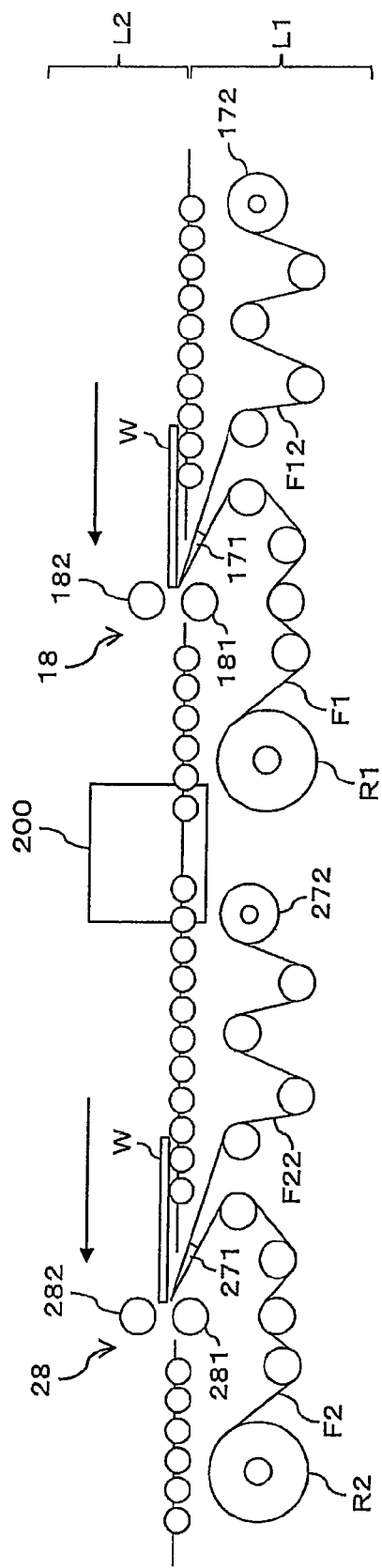
FIG. 9A is a schematic side view showing another example of the arrangement of continuous rolls and take-up rolls.
Figure 9B:
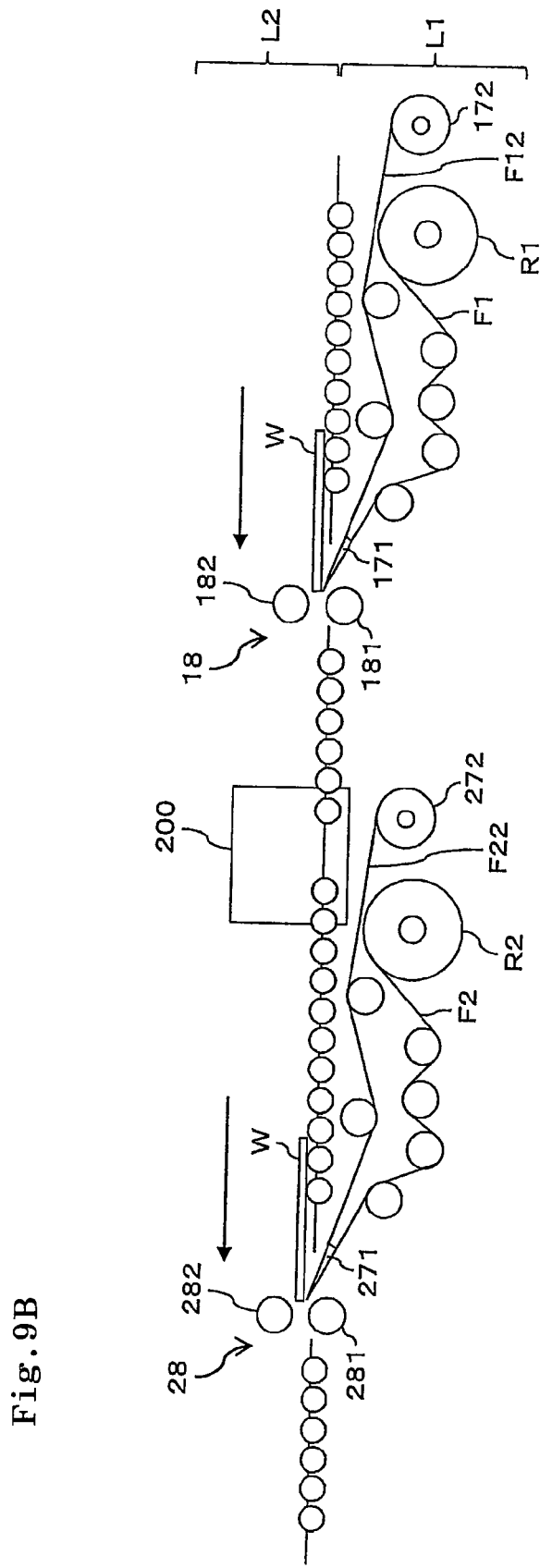
FIG. 9B is a schematic side view showing a further example of the arrangement of continuous rolls and take-up rolls.

FIGS. 9A and 9B are schematic side views showing other examples of the arrangement of continuous rolls R1 and R2 and take-up rolls 172 and 272. In both examples shown in FIGS. 9A and 9B, a first take-up roll 172 and a first continuous roll R1 are arranged in this order along a direction parallel to the feeding direction of the liquid crystal panel W on the panel feeding line L2, and a second take-up roll 272 and a second continuous roll R2 are also arranged in this order along a direction parallel to the feeding direction of the liquid crystal panel W on the panel feeding line L2.

More specifically, in the example shown in FIG. 9A, the optical film laminates F1 and F2 are fed from the continuous rolls R1 and R2, respectively, in a direction opposite to the feeding direction of the liquid crystal panel W, and the carrier films F12 and F22 peeled off by the peeling units 171 and 271 are fed in a direction opposite to the feeding direction of the liquid crystal panel W and wound onto the take-up rolls 172 and 272, respectively. On the other hand, in the example shown in FIG. 9B, the optical film laminates F1 and F2 are fed from the continuous rolls R1 and R2, respectively, in the same direction as the feeding direction of the liquid crystal panel W, and the carrier films F12 and F22 peeled off by the peeling units 171 and 271 are fed in a direction opposite to the feeding direction of the liquid crystal panel W, allowed to pass through above the continuous rolls R1 and R2, and wound onto the take-up rolls 172 and 272, respectively.

In the structures illustrated in the FIGS. 9A and 9B, the first optical film laminate F1 can be fed from the first continuous roll R1 at the same level as the first carrier film F12 is wound onto the first take-up roll 172, and the second optical film laminate F2 can be fed from the second continuous roll R2 at the same level as the second carrier film F22 is wound onto the second take-up roll 272. This allows easy attachment or detachment of the continuous rolls R1 and R2 and the take-up rolls 172 and 272. For example, when the continuous rolls R1 and R2 and the take-up rolls 172 and 272 are attached or detached using an attachment/detachment mechanism, there is no need to control the level of the attachment/detachment mechanism, which improves the workability.

FIGS. 9A and 9B show examples using a panel turning unit 200. Alternatively, a panel rotating mechanism 20 and a panel-turning-over mechanism 21 may be provided independently.

What is claimed is:

1. A system with a linear line structure for manufacturing a liquid crystal display element by a process comprising feeding optical functional films from first and second continuous rolls with different widths, respectively, which are each formed by winding, into a roll, a long optical functional film comprising a polarizing film, transversely cutting the optical functional films into sheet pieces of the optical functional films, and bonding the sheet pieces to both surfaces of a rectangular liquid crystal panel, comprising:

film feeding lines that are arranged to feed the optical functional films from the first and second continuous rolls in such a manner that the optical functional films being fed are linearly aligned with each other in planar view;

a panel feeding line that is placed above the film feeding lines in an overlapping manner and placed to feed the liquid crystal panel linearly in planar view; and a panel turning unit that is provided in the panel feeding line to turn over and horizontally rotate the liquid crystal panel so that bonding of one of the sheet pieces of the optical functional films to the liquid crystal panel from below can be followed by bonding of another one of the sheet pieces of the optical functional films thereto from below.

2. A system with a linear line structure for manufacturing a liquid crystal display element by a process comprising feeding optical functional films from first and second continuous rolls with different widths, respectively, which are each formed by winding, into a roll, a long optical functional film comprising a polarizing film, transversely cutting the optical functional films into sheet pieces of the optical functional films, and bonding the sheet pieces to both surfaces of a rectangular liquid crystal panel, comprising:

film feeding lines that are arranged to feed the optical functional films from the first and second continuous rolls in such a manner that the optical functional films being fed are linearly aligned with each other in planar view;

a panel feeding line that is placed above the film feeding lines in an overlapping manner and placed to feed the liquid crystal panel linearly in planar view; and a panel turning unit that is provided in the panel feeding line to turn over the liquid crystal panel about an axis neither parallel to a long side of the liquid crystal panel nor to a short side of the liquid crystal panel so that a positional relationship between the long and short sides of the liquid crystal panel can be reversed and that bonding of one of the sheet pieces of the optical functional films to the liquid crystal panel from below can be followed by bonding of another one of the sheet pieces of the optical functional films thereto from below.

3. The system according to claim 1, which is configured to manufacture the liquid crystal display element by a process comprising feeding optical functional films and carrier films from first and second continuous rolls with different widths, respectively, which are each formed by winding, into a roll, a laminate comprising a carrier film and a long optical functional film comprising a polarizing film, transversely cutting the optical functional films into sheet pieces of the optical functional films, while leaving the carrier films uncut, peeling off the sheet pieces from the carrier films, and bonding the sheet pieces to both surfaces of the rectangular liquid crystal panel, wherein the film feeding lines are provided with first and second take-up rolls for taking up the carrier films having been fed from the first and second continuous rolls, respectively, after the sheet pieces of the optical functional films are peeled off from the carrier films, and the first take-up roll and the first continuous roll are arranged in this order along a direction parallel to the feeding direction of the liquid crystal panel in the panel feeding line, and the second take-up roll and the second continuous roll are arranged in this order along a direction parallel to the feeding direction of the liquid crystal panel in the panel feeding line.

4. A system with a linear line structure for manufacturing a liquid crystal display element by a process comprising feeding sheet pieces of optical functional films and carrier films from first and second continuous rolls with different widths, respectively, which are each formed by winding, into a roll, a laminate comprising a carrier film and sheet pieces of an optical functional film comprising a polarizing film, peeling off the sheet pieces of the optical functional films from the carrier films, and bonding the sheet pieces to both surfaces of a rectangular liquid crystal panel, comprising:

film feeding lines that are arranged to feed the optical functional films from the first and second continuous rolls in such a manner that the optical functional films being fed are linearly aligned with each other in planar view;
a panel feeding line that is placed above the film feeding lines in an overlapping manner and placed to feed the liquid crystal panel linearly in planar view; and
a panel turning unit that is provided in the panel feeding line to turn over and horizontally rotate the liquid crystal panel so that bonding of one of the sheet pieces of the optical functional films to the liquid crystal panel from below can be followed by bonding of another one of the sheet pieces of the optical functional films thereto from below.

5. A system with a linear line structure for manufacturing a liquid crystal display element by a process comprising feeding sheet pieces of optical functional films and carrier films from first and second continuous rolls with different widths, respectively, which are each formed by winding, into a roll, a laminate comprising a carrier film and sheet pieces of an optical functional film comprising a polarizing film, peeling off the sheet pieces of the optical functional films from the carrier films, and bonding the sheet pieces to both surfaces of a rectangular liquid crystal panel, comprising:
film feeding lines that are arranged to feed the optical functional films from the first and second continuous rolls in such a manner that the optical functional films being fed are linearly aligned with each other in planar view;
a panel feeding line that is placed above the film feeding lines in an overlapping manner and placed to feed the liquid crystal panel linearly in planar view; and
a panel turning unit that is provided in the panel feeding line to turn over the liquid crystal panel about an axis neither parallel to a long side of the liquid crystal panel nor to a short side of the liquid crystal panel so that a positional relationship between the long and short sides of the liquid crystal panel can be reversed and that bonding of one of the sheet pieces of the optical functional films to the liquid crystal panel from below can be followed by bonding of another one of the sheet pieces of the optical functional films thereto from below.

6. The system according to claim 4, wherein
the film feeding lines are provided with first and second take-up rolls for taking up the carrier films having been fed from the first and second continuous rolls, respectively, after the sheet pieces of the optical functional films are peeled off from the carrier films, and
the first take-up roll and the first continuous roll are arranged in this order along a direction parallel to the feeding direction of the liquid crystal panel in the panel feeding line, and the second take-up roll and the second continuous roll are arranged in this order along a direction parallel to the feeding direction of the liquid crystal panel in the panel feeding line.

7. The system according to any one of claims 1 to 6, further comprising a partition structure in which the film feeding lines and the panel feeding line are placed.

8. A method for manufacturing a liquid crystal display element by a process comprising feeding optical functional films from first and second continuous rolls with different widths, respectively, which are each formed by winding, into a roll, a long optical functional film comprising a polarizing film, transversely cutting the optical functional films into sheet pieces of the optical functional films, and bonding the sheet pieces to both surfaces of a rectangular liquid crystal panel, comprising:
a film feeding step comprising feeding the optical functional films from the first and second continuous rolls using film feeding lines arranged in such a manner that the optical functional films being fed are linearly aligned with each other in planar view;
a panel feeding step comprising feeding the liquid crystal panel using a panel feeding line that is placed above the film feeding lines in an overlapping manner and placed to feed the liquid crystal panel linearly in planar view; and
a panel turning step comprising turning over and horizontally rotating the liquid crystal panel using a panel turning unit that is provided in the panel feeding line so that bonding of one of the sheet pieces of the optical functional films to the liquid crystal panel from below can be followed by bonding of another one of the sheet pieces of the optical functional films thereto from below.

9. A method for manufacturing a liquid crystal display element by a process comprising feeding optical functional films from first and second continuous rolls with different widths, respectively, which are each formed by winding, into a roll, a long optical functional film comprising a polarizing film, transversely cutting the optical functional films into sheet pieces of the optical functional films, and bonding the sheet pieces to both surfaces of a rectangular liquid crystal panel, comprising:
a film feeding step comprising feeding the optical functional films from the first and second continuous rolls using film feeding lines arranged in such a manner that the optical functional films being fed are linearly aligned with each other in planar view;
a panel feeding step comprising feeding the liquid crystal panel using a panel feeding line that is placed above the film feeding lines in an overlapping manner and placed to feed the liquid crystal panel linearly in planar view; and
a panel turning step comprising turning over the liquid crystal panel about an axis neither parallel to a long side of the liquid crystal panel nor to a short side of the liquid crystal panel using a panel turning unit that is provided in the panel feeding line so that a positional relationship between the long and short sides of the liquid crystal panel can be reversed and that bonding of one of the sheet pieces of the optical functional films to the liquid crystal panel from below can be followed by bonding of another one of the sheet pieces of the optical functional films thereto from below.

10. The method according to claim 8, which is for manufacturing the liquid crystal display element by a process comprising feeding optical functional films and carrier films from first and second continuous rolls with different widths, respectively, which are each formed by winding, into a roll, a laminate comprising a carrier film and a long optical functional film comprising a polarizing film, transversely cutting the optical functional films into sheet pieces of the optical functional films, while leaving the carrier films uncut, peeling off the sheet pieces from the carrier films, and bonding the sheet pieces to both surfaces of the rectangular liquid crystal panel, wherein
the film feeding lines are provided with first and second take-up rolls for taking up the carrier films having been fed from the first and second continuous rolls, respectively, after the sheet pieces of the optical functional films are peeled off from the carrier films, and
the first take-up roll and the first continuous roll are arranged in this order along a direction parallel to the feeding direction of the liquid crystal panel in the panel feeding line, and the second take-up roll and the second continuous roll are arranged in this order along a direction parallel to the feeding direction of the liquid crystal panel in the panel feeding line.

11. A method for manufacturing a liquid crystal display element by a process comprising feeding sheet pieces of optical functional films and carrier films from first and second continuous rolls with different widths, respectively, which are each formed by winding, into a roll, a laminate comprising a carrier film and sheet pieces of an optical functional film comprising a polarizing film, peeling off the sheet pieces of the optical functional films from the carrier films, and bonding the sheet pieces to both surfaces of a rectangular liquid crystal panel, comprising:
   a film feeding step comprising feeding the optical functional films from the first and second continuous rolls using film feeding lines arranged in such a manner that the optical functional films being fed are linearly aligned with each other in planar view;
   a panel feeding step comprising feeding the liquid crystal panel using a panel feeding line that is placed above the film feeding lines in an overlapping manner and placed to feed the liquid crystal panel linearly in planar view; and
   a panel turning step comprising turning over and horizontally rotating the liquid crystal panel using a panel turning unit that is provided in the panel feeding line so that bonding of one of the sheet pieces of the optical functional films to the liquid crystal panel from below can be followed by bonding of another one of the sheet pieces of the optical functional films thereto from below.

12. A method for manufacturing a liquid crystal display element by a process comprising feeding sheet pieces of optical functional films and carrier films from first and second continuous rolls with different widths, respectively, which are each formed by winding, into a roll, a laminate comprising a carrier film and sheet pieces of an optical functional film comprising a polarizing film, peeling off the sheet pieces of the optical functional films from the carrier films, and bonding the sheet pieces to both surfaces of a rectangular liquid crystal panel, comprising:
   a film feeding step comprising feeding the optical functional films from the first and second continuous rolls using film feeding lines arranged in such a manner that the optical functional films being fed are linearly aligned with each other in planar view;
   a panel feeding step comprising feeding the liquid crystal panel using a panel feeding line that is placed above the film feeding lines in an overlapping manner and placed to feed the liquid crystal panel linearly in planar view; and
   a panel turning step comprising turning over the liquid crystal panel about an axis neither parallel to a long side of the liquid crystal panel nor to a short side of the liquid crystal panel using a panel turning unit that is provided in the panel feeding line so that a positional relationship between the long and short sides of the liquid crystal panel can be reversed and that bonding of one of the sheet pieces of the optical functional films to the liquid crystal panel from below can be followed by bonding of another one of the sheet pieces of the optical functional films thereto from below.

13. The method according to claim 11, wherein
the film feeding lines are provided with first and second take-up rolls for taking up the carrier films having been fed from the first and second continuous rolls, respectively, after the sheet pieces of the optical functional films are peeled off from the carrier films, and
the first take-up roll and the first continuous roll are arranged in this order along a direction parallel to the feeding direction of the liquid crystal panel in the panel feeding line, and the second take-up roll and the second continuous roll are arranged in this order along a direction parallel to the feeding direction of the liquid crystal panel in the panel feeding line.

14. The method according to any one of claims 8 to 13, wherein the film feeding lines and the panel feeding line are placed in a partition structure.

15. The system according to claim 2, which is configured to manufacture the liquid crystal display element by a process comprising feeding optical functional films and carrier films from first and second continuous rolls with different widths, respectively, which are each formed by winding, into a roll, a laminate comprising a carrier film and a long optical functional film comprising a polarizing film, transversely cutting the optical functional films into sheet pieces of the optical functional films, while leaving the carrier films uncut, peeling off the sheet pieces from the carrier films, and bonding the sheet pieces to both surfaces of the rectangular liquid crystal panel, wherein
   the film feeding lines are provided with first and second take-up rolls for taking up the carrier films having been fed from the first and second continuous rolls, respectively, after the sheet pieces of the optical functional films are peeled off from the carrier films, and
   the first take-up roll and the first continuous roll are arranged in this order along a direction parallel to the feeding direction of the liquid crystal panel in the panel feeding line, and the second take-up roll and the second continuous roll are arranged in this order along a direction parallel to the feeding direction of the liquid crystal panel in the panel feeding line.

16. The system according to claim 5, wherein
   the film feeding lines are provided with first and second take-up rolls for taking up the carrier films having been fed from the first and second continuous rolls, respectively, after the sheet pieces of the optical functional films are peeled off from the carrier films, and
   the first take-up roll and the first continuous roll are arranged in this order along a direction parallel to the feeding direction of the liquid crystal panel in the panel feeding line, and the second take-up roll and the second continuous roll are arranged in this order along a direction parallel to the feeding direction of the liquid crystal panel in the panel feeding line.

17. The method according to claim 10, which is for manufacturing the liquid crystal display element by a process comprising feeding optical functional films and carrier films from first and second continuous rolls with different widths, respectively, which are each formed by winding, into a roll, a laminate comprising a carrier film and a long optical functional film comprising a polarizing film, transversely cutting the optical functional films into sheet pieces of the optical functional films, while leaving the carrier films uncut, peeling off the sheet pieces from the carrier films, and bonding the sheet pieces to both surfaces of the rectangular liquid crystal panel, wherein
   the film feeding lines are provided with first and second take-up rolls for taking up the carrier films having been fed from the first and second continuous rolls, respectively, after the sheet pieces of the optical functional films are peeled off from the carrier films, and
   the first take-up roll and the first continuous roll are arranged in this order along a direction parallel to the feeding direction of the liquid crystal panel in the panel feeding line, and the second take-up roll and the second continuous roll are arranged in this order along a direction parallel to the feeding direction of the liquid crystal panel in the panel feeding line.

18. The method according to claim 12, wherein the film feeding lines are provided with first and second take-up rolls for taking up the carrier films having been fed from the first and second continuous rolls, respectively, after the sheet pieces of the optical functional films are peeled off from the carrier films, and the first take-up roll and the first continuous roll are arranged in this order along a direction parallel to the feeding direction of the liquid crystal panel in the panel feeding line, and the second take-up roll and the second continuous roll are arranged in this order along a direction parallel to the feeding direction of the liquid crystal panel in the panel feeding line.

\* \* \* \* \*